United States Patent Office 3,048,613
Patented Aug. 7, 1962

3,048,613
ORGANO-PHOSPHORUS COMPOUNDS AND PROCESS OF MAKING SAME
Elbert C. Ladd and Merlin P. Harvey, Passaic, N.J., assignors to United States Rubber Company, New York, N.Y., a corporation of New Jersey
No Drawing. Original application Mar. 17, 1953, Ser. No. 351,494, now Patent No. 2,971,019, dated Feb. 7, 1961. Divided and this application May 24, 1960, Ser. No. 31,263
8 Claims. (Cl. 260—461)

The invention concerns a novel method for the preparation of functionally aliphatic organo-phosphorus compounds. More specifically, our invention relates to a novel alkaline-catalyzed addition reaction of a selected compound containing a phosphorus-hydrogen bond, particularly an ester of phosphorous acid or of a phosphinic acid, with a selected organic compound having a multiply-bonded carbon atom, particularly one or more carbon-carbon double bonds or carbon-nitrogen double bonds. This application is a division of copending application Serial No. 351,494, filed March 17, 1953, now U.S. Patent 2,971,019, granted February 7, 1961.

Our invention can be illustrated schematically by the reaction of a pentavalent phosphorus compound having a phosphorus-hydrogen bond, with an ethylenic linkage:

(1) 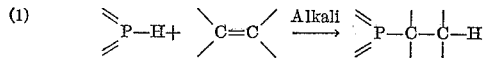

Similarly with a compound containing a carbon-nitrogen double bond:

(2) 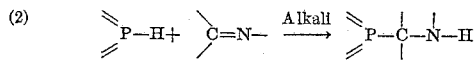

Heretofore the commercial utility of functionally aliphatic organo-phosphorus compounds has been handicapped by the limited number and the specificity of the synthetic methods available, and particularly by the limited number of the operable phosphorus-containing reagents. The latter, for the most part, comprise phosphorus halides which, under suitable conditions, can be made to undergo an alkylation-type of reaction with a number of aliphatic compounds, particularly olefines. Such products can then be usefully modified by reaction with water, amines, alcohols, etc.

Now, however, as a result of our discovery, a new synthetic method is made available whereby a compound containing a phosphorus-hydrogen bond may be caused to react with a compound containing a carbon-carbon and/or a carbon-nitrogen double bond in the presence of alkali to yield a functionally aliphatic organo-phosphorus compound. The reaction proceeds readily and, in fact, spontaneously in many cases. Hence, it provides a simple, direct and economical synthetic method whereby a large variety of new functionally aliphatic organo-phosphorus compounds can be obtained, many of which are themselves useful without further modification in applications such as lube-oil additives, textile assistants, surface-active agents, plasticizers, anti-oxidants for textiles and rubber or rubber-like elastomers, rubber accelerators and corrosion inhibitors.

In the method of our invention, the preferred phosphorus-containing starting materials are selected from the class consisting of esters of phosphorous acid and esters of phosphinic acids, having the type formula

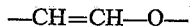

wherein R* is a radical from the class of alkyl (e.g., methyl, ethyl, propyl, isopropyl, butyl, isobutyl, amyl, hexyl, cyclohexyl, heptyl, octyl, nonyl, decyl, undecyl and dodecyl), alkenyl (e.g., vinyl, allyl, methallyl, crotyl, cinnamyl, 10-undecylenyl and cyclohexenyl), aryl (e.g., phenyl, p-chlorophenyl, 3,5-dichlorophenyl, 2,4-dichlorophenyl, p-cyanophenyl, p-nitrophenyl, 3,5-dinitrophenyl, p-aminophenyl, p-hydroxyphenyl, p-methoxyphenyl, tolyl, xylyl, xenyl and naphthyl) and aralkyl (e.g., benzyl, p-chlorobenzyl and phenethyl); M is oxygen or sulfur, R⁰ is —R* or —MR*; and P is phosphorus.

The preferred unsaturated compounds, to which the above phosphorus-containing reagents can be added by our method, are selected from the class of olefinic materials of the type formula $R_1R_2C=CR_3R_4$ and azine compounds of the type formula $YY'C=N-Y''$, wherein $R_1$ is hydrogen or is alkyl, alkenyl, aryl or aralkyl as previously defined for R*, or is alpha-furyl, or alpha-thienyl, $R_2$ and $R_3$ are each one of the radicals hydrogen, alkyl, alkenyl, aryl, aralkyl, carboxyl or a group hydrolyzable thereto from the class of carbalkoxy (e.g., carbomethoxy, carboethoxy, carbobutoxy, carbocyclohexoxy, carbo-2-ethylhexoxy and carbodecoxy), carbalkenoxy (e.g., carboallyloxy and carbomethallyloxy), carbaryloxy (e.g., carbophenoxy), carbaralkoxy (e.g., carbobenzyloxy), carbonitrilo, carbamyl, including N-alkyl, N-alkenyl, N-aryl and N-aralkyl-carbamyl, and $R_2$ and $R_3$ may together comprise beta-ethylenoxy, i.e., —$CH_2$—$CH_2$—O—, or vinyleneoxy, i.e.

—CH=CH—O— vinylenemercapto, i.e., —CH=CH—S—, or carbanhydro; $R_4$ is one of the radicals nitro, carboxyl and groups hydrolyzable thereto, carboxymethyl and groups hydrolyzable thereto, (e.g., carboxymethyl, carbalkoxymethyl and carbonitrilomethyl), phosphono, phosphonomethyl and the corresponding alkyl, alkenyl, aryl and aralkyl esters thereof (e.g., diethylphosphono, dicresylphosphono and diphenyl phosphonomethyl), acyloxy and acyloxymethyl (e.g., acetoxy, chloroacetoxy, cyanoacetoxy, acetoxymethyl, ethylphosphato, acryloxymethyl, crotonoylmethyl, propionoxy, butyroxy, benzoyloxy, benzoyloxymethyl, p-chlorobenzoyloxy, and p-methylbenzoyloxy, including the analogous thio groups), acyl and acylmethyl (e.g., formyl, formylmethyl, acetyl, acetylmethyl, propionyl, butyryl, isobutyryl, valeroyl, acrylyl, crotonyl, cinnamyl, isobutenoyl, methanesulfonyl, benzenesulfonyl, vinylsulfonyl, benzoyl, p-methylbenzoyl, p-chlorobenzoyl, naphthoyl and phenacetyl), alkoxy and alkoxymethyl (e.g., methoxy, ethoxy, ethoxymethyl, propoxy, isopropoxy, butoxy, butoxymethyl, isobutoxy, amyloxy, hexoxy, cyclohexoxy, heptoxy, octoxy, nonoxy and decoxy), alkenyloxy and alkenyloxymethyl (e.g., vinyloxy, vinyloxymethyl, isopropenyloxy, allyloxy, allyloxymethyl, methallyloxymethyl and 2-butenoxy), aryloxy and aryloxymethyl (e.g., phenoxy, phenoxymethyl, p-chlorophenoxy, o,p-dichlorophenoxy, p-methylphenoxy, and naphthoxy), aralkoxy and aralkoxymethyl (e.g., benzyloxy, phenethoxy and benzyloxymethyl) and the corresponding thio-ether groups; each of Y and Y' is one of the radicals hydrogen and —R* or Y and Y' together may stand for oxygen, sulfur, tetramethylene or pentamethylene; and Y'' is hydrogen, —R*, hydroxyl, acyloxy, alkoxy, alkenoxy, aryloxy, aralkoxy, the group —N=CYY', or —$R_z$—N=CYY' where $R_z$ is a divalent hydrocarbon radical, e.g., methylene, ethylene, propylene, trimethylene, tetramethylene, pentamethylene, hexamethylene, heptamethylene, decamethylene and phenylene.

Illustrative examples of our reaction are tabulated below:

(3) $(C_2H_5O)_2PHO + CH_2=CH-NO_2 \rightarrow$
    $(C_2H_5O)_2P(O)-CH_2-CH_2-NO_2$ (4) $(C_2H_5O)_2PHO + CH_2=CH-CO-OCH_3 \rightarrow$
    $(C_2H_5O)_2P(O)-CH_2-CH_2-CO-OCH_3$ (5) $(C_4H_9O)_2PHO + CH_2=CH-CO-NHCH_3 \rightarrow$
    $(C_4H_9O)_2P(O)-CH_2-CH_2-CO-NHCH_3$ (6) $C_2H_5O\text{---}PH(O)\text{---}C_2H_5+CH_2\text{=}CH\text{---}CH\rightarrow$
    $C_2H_5O\text{---}P(O)(C_2H_5)\text{---}CH_2\text{---}CH_2\text{---}CN$ (7) $(C_6H_5O)_2PHO+CH_3\text{---}CH\text{=}CH\text{---}CO\text{---}OCH_3\rightarrow$
    $(C_6H_5O)_2P(O)\text{---}CH(CH_3)\text{---}CH_2\text{---}CO\text{---}OCH_3$ (8) 

(9) $(C_2H_5O)_2PHO+CH_2\text{=}C(CO\text{---}OC_2H_5)$
    $\text{---}CH_2\text{---}CO\text{---}OC_2H_5\rightarrow(C_2H_5O)_2P(O)CH_2$
    $\text{---}CH(CO\text{---}OC_2H_5)\text{---}CH_2\text{---}CO\text{---}OC_2H_5$

(10) $(C_2H_5O)_2PHO+CH_2\text{=}C(CO\text{---}OC_2H_5)_2\rightarrow$
     $(C_2H_5O)_2P(O)\text{---}CH_2\text{---}CH(CO\text{---}OC_2H_5)_2$

(11) $(CH_3O)_2PHO+NC\text{---}CH\text{=}CH\text{---}CN\rightarrow$
     $(CH_3O)_2P(O)\text{---}CH(CN)\text{---}CH_2\text{---}CN$

(12) $(CH_2\text{=}CH\text{---}CH_2O)_2PHO+CH_2\text{=}CH\text{---}CN\rightarrow$
     $(CH_2\text{=}CH\text{---}CH_2O)_2P(O)\text{---}CH_2\text{---}CH_2\text{---}CN$

(13) $(NC\text{---}C_2H_4O)_2PHO+CH_2\text{=}CH$
     $\text{---}P(O)(OC_2H_5)_2\rightarrow(NC\text{---}C_2H_4O)_2P(O)$
     $\text{---}CH_2\text{---}CH_2\text{---}P(O)(OC_2H_5)_2$

(14) $(C_8H_{17}O)_2PHO+CH_2\text{=}CH\text{---}OCO\text{---}CH_3\rightarrow$
     $CH_3\text{---}CH[P(O)(OC_8H_{17})_2]\text{---}OCO\text{---}CH_3$

(15) $(C_2H_5O)_2PHO+CH_2\text{=}CH\text{---}OCO\text{---}C_6H_4Cl\rightarrow$
     $(C_2H_5O)_2P(O)\text{---}CH_2\text{---}CH_2\text{---}OCO\text{---}C_6H_4Cl$

(16) $(C_2H_5O)_2PHO+CH_2\text{=}CH\text{---}CH_2\text{---}OCO\text{---}CH_3\rightarrow$
     $(C_2H_5O)_2P(O)\text{---}CH_2\text{---}CH_2\text{---}CH_2\text{---}OCO\text{---}CH_3$

(17) $C_2H_5O\text{---}PH(O)\text{---}C_4H_9+CH_2\text{=}CH\text{---}CO\text{---}CH_3\rightarrow$
     $C_2H_5O\text{---}P(O)(C_4H_9)\text{---}CH_2\text{---}CH_2\text{---}CO\text{---}CH_3$

(18) $(CH_3O)_2PHO+CH_2\text{=}C(CH_3)\text{---}CO\text{---}CH_3\rightarrow$
     $(CH_3O)_2P(O)\text{---}CH_2\text{---}CH(CH_3)\text{---}CO\text{---}CH_3$

(19) $(C_4H_9O)_2PHO+CH_2\text{=}CH\text{---}CO\text{---}C_6H_5\rightarrow$
     $(C_4H_9O)_2P(O)\text{---}CH_2\text{---}CH_2\text{---}CO\text{---}C_6H_5$

(20) $(NC\text{---}C_2H_4O)_2PHO+CH_2\text{=}CH\text{---}CO\text{---}C_6H_4Cl\rightarrow$
     $(NC\text{---}C_2H_5O)_2P(O)\text{---}CH_2\text{---}CH_2\text{---}CO\text{---}C_6H_4Cl$

(21) $(NC\text{---}C_2H_4O)_2PHS+CH_2\text{=}CH\text{---}CO\text{---}C_6H_3Cl_2\rightarrow$
     $(NC\text{---}C_2H_4O)_2P(S)\text{---}CH_2\text{---}CH_2\text{---}CO\text{---}C_6H_3Cl_2$

(22) $C_2H_5O\text{---}PH(O)\text{---}C_6H_5+CH_2\text{=}CH\text{---}O\text{---}C_2H_5\rightarrow$
     $CH_3\text{---}CH[P(O)(C_6H_5)(OC_2H_5)]\text{---}O\text{---}C_2H_5$

(23) $(C_6H_5O)_2PHO+CH_2\text{=}CH\text{---}O\text{---}C_4H_9\rightarrow$
     $CH_3\text{---}CH[P(O)(OC_6H_5)_2]\text{---}O\text{---}C_4H_9$

(24) $(Cl\text{---}C_6H_4O)_2PHO+CH_2\text{=}CH\text{---}CH_2\text{---}O$
     $\text{---}C_6H_4\text{---}Cl\rightarrow CH_3\text{---}CH[P(O)(OC_6H_4Cl)_2]$
     $\text{---}CH_2\text{---}O\text{---}C_6H_4Cl$

(25) $(Cl\text{---}C_2H_4O)_2PHO+CH_2\text{=}CH\text{---}CH_2\text{---}O$
     $\text{---}C_6H_4\text{---}NO_2\rightarrow CH_3\text{---}CH[P(O)(OC_2H_4Cl)_2]CH_2$
     $\text{---}O\text{---}C_6H_4\text{---}NO_2$

(26) $(CH_3O)_2PHO+CH_2\text{=}CH\text{---}O\text{---}CH_2\text{---}C_6H_5\rightarrow$
     $CH_3\text{---}CH[P(O)(OCH_3)_2]\text{---}O\text{---}CH_2\text{---}C_6H_5$

(27) $Cl\text{---}C_2H_4O\text{---}PH(O)\text{---}C_6H_5+CH_2\text{=}CH$
     $\text{---}O\text{---}C_{10}H_7\rightarrow CH_3\text{---}CH[P(O)(OC_2H_4Cl)(C_6H_5)]$
     $\text{---}O\text{---}C_{10}H_7$

(28) $(C_2H_5O)_2PHO+CH_2\text{=}CH\text{---}O\text{---}CH\text{=}CH_2\rightarrow$
     $(CH_2\text{---}CH[P(O)(OC_2H_5)_2])_2O$

(29) $(CH_2\text{=}CH\text{---}CH_2O)_2PHO+CH_2\text{=}CH\text{---}S$
     $\text{---}C_2H_5\rightarrow CH_3\text{---}CH[P(O)(OCH_2\text{---}CH\text{=}CH_2)_2]$
     $\text{---}S\text{---}C_2H_5$

(30) $(CH_3O)_2PHO+CH_2\text{=}CH\text{---}SO_2\text{---}C_2H_5\rightarrow$
     $(CH_3O)_2P(O)\text{---}CH_2\text{---}CH_2\text{---}SO_2\text{---}C_2H_5$

(31) $(C_4H_9O)_2PHO+CH_2\text{=}CH\text{---}CO\text{---}O\text{---}CH_2$
     $\text{---}CH\text{=}CH_2\rightarrow(C_4H_9O)_2P(O)\text{---}CH_2\text{---}CH_2\text{---}CO\text{---}O$
     $\text{---}CH_2CH\text{=}CH_2+(C_4H_9O)_2P(O)\text{---}CH_2\text{---}CH\text{---}CO$
     $\text{---}O\text{---}CH_2\text{---}CH\text{---}[P(O)(OC_2H_5)_2]\text{---}CH_3$

(32) $(CH_3O)_2PHO+(CH_3)_2C\text{=}N\text{---}N\text{=}$
     $\text{---}O\text{---}CH_2\text{---}CH\text{---}[P(O)(OC_2H_5)_2]\text{---}CH_3$

(33) $(Cl\text{---}C_2H_4O)_2PHO+CH_3\text{---}CH\text{=}N\text{---}C_4H_9\rightarrow$
     $(Cl\text{---}C_2H_4O)_2P(O)\text{---}CH(CH_3)\text{---}NH\text{---}C_4H_9$

(34) $C_2H_5O\text{---}PH(O)\text{---}C_6H_5+C_6H_5\text{---}CH\text{=}N$
     $\text{---}C_6H_5\rightarrow C_2H_5O\text{---}P(O)(C_6H_5)$
     $\text{---}CH(C_6H_5)\text{---}NH\text{---}C_6H_5$

(35) $(C_2H_5O)_2PHO+SCN\text{---}C_6H_5\rightarrow$
     $(C_2H_5O)_2P(O)\text{---}C(S)\text{---}NH\text{---}C_6H_5$

(36) $(C_6H_5O)\text{---}PH(O)\text{---}C_6H_5+OCN\text{---}C_4H_9\rightarrow$
     $(C_6H_5O)\text{---}P(O)(C_6H_5)\text{---}C(O)\text{---}NH\text{---}C_4H_9$

(37) $(NC\text{---}C_2H_4O)_2PHO+SCN\text{---}C_6H_5\rightarrow$
     $(NC\text{---}C_2H_4O)_2P(O)\text{---}C(S)\text{---}NH\text{---}C_6H_5$

(38) $(Cl\text{---}C_6H_4O)_2PHO+SCN\text{---}C_{10}H_7\rightarrow$
     $(Cl\text{---}C_6H_4O)_2P(O)\text{---}C(S)\text{---}NH\text{---}C_{10}H_7$

(39) $O_2N\text{---}C_6H_4O\text{---}PH(O)\text{---}C_4H_9+CH_3\text{---}CH_2$
     $\text{---}CH\text{=}N\text{---}OCH_3\rightarrow O_2N\text{---}C_6H_4O\text{---}P(O)(C_4H_9)$
     $\text{---}CH(CH_2\text{---}CH_3)\text{---}NH\text{---}OCH_3$

(40) $(CH_2\text{=}CH\text{---}CH_2O)_2PHO+CH_2CH\text{---}CO$
     $\text{---}OCH\text{---}CH\text{=}CH_2\rightarrow(CH_2\text{=}CH\text{---}CH_2O)_2P(O)$
     $\text{---}CH_2\text{---}CH_2\text{---}CO\text{---}OCH_2\text{---}CH\text{=}CH_2$

(41) 

(42) $(CH_2\text{=}CH\text{---}CH_2O)_2PHO+CH\text{---}CO\text{---}OCH_2\text{---}CH\text{=}CH_2\rightarrow$
     $CH_2\text{=}CH\text{---}CH_2O\text{---}OC\text{---}CH$
     $(CH_2\text{=}CH\text{---}CH_2O)_2P(O)\text{---}CH\text{---}CO\text{---}OCH_2CH\text{=}CH$
     $CH_2\text{---}CO\text{---}OCH_2\text{---}CH\text{=}CH_2$

(43) $(CH_2\text{=}CH\text{---}CH_2O)_2PHO+CH_2\text{=}CH\text{---}CO$
     $\text{---}OC_4H_9\rightarrow(CH_2\text{=}CH\text{---}CH_2O)_2P(O)$
     $\text{---}CH_2\text{---}CH_2\text{---}CO\text{---}OC_4H_9$

(44) $(C_2H_5O)_2PHO+(CH_3)_2C\text{=}N\text{---}N\text{=}C(CH_3)_2\rightarrow$
     $(C_2H_5O)_2P(O)\text{---}C(CH_3)_2\text{---}NH\text{---}N\text{=}C(CH_3)_2$
     $+[(C_2H_5O)_2P(O)\text{---}C(CH_3)_2\text{---}NH]_2$

(45) $(C_2H_5O)_2PHO+Cl\text{---}C_6H_4\text{---}CH\text{=}N\text{---}N$
     $\text{=}CH\text{---}C_6H_4\text{---}Cl\rightarrow(C_2H_5O)_2P(O)\text{---}CH(C_6H_4\text{---}Cl)$
     $\text{---}NH\text{---}N\text{=}CH\text{---}C_6H_4\text{---}Cl+[(C_2H_5O)_2P(O)$
     $\text{---}CH(C_6H_4\text{---}Cl)\text{---}NH]_2$

(46) $(CH_3O)_2PHO+C_6H_5\text{---}CH\text{=}N\text{---}C_6H_4\text{---}Cl\rightarrow$
     $(CH_3O)_2P(O)\text{---}CH(C_6H_5)\text{---}NH\text{---}C_6H_4\text{---}Cl$

(47) $C_4H_9O\text{---}PH(O)\text{---}C_6H_5+C_6H_5\text{---}CH\text{=}N$
     $\text{---}C_6H_4\text{---}NO_2\rightarrow C_4H_9O\text{---}P(O)(C_6H_5)$
     $\text{---}CH(C_6H_5)\text{---}NH\text{---}C_6H_4\text{---}NO_2$

(48) $(C_4H_9O)_2PHO+C_6H_5\text{---}CH\text{=}N\text{---}C_6H_4\text{---}OH\rightarrow$
     $(C_4H_9O)_2P(O)\text{---}CH(C_6H_5)\text{---}NH\text{---}C_6H_4\text{---}OH$

(49) $(C_6H_5O)_2PHO+C_6H_5\text{---}CH\text{=}N\text{---}C_6H_4\text{---}OCH_3\rightarrow$
     $(C_6H_5O)_2P(O)\text{---}CH(C_6H_5)\text{---}NH\text{---}C_6H_4\text{---}OCH_3$

(50) $(C_6H_5O)_2PHO+CH_3\text{---}CH\text{=}N\text{---}C_6H_5\rightarrow$
     $(C_6H_5O)_2P(O)\text{---}CH(CH_3)\text{---}NH\text{---}C_6H_5$

(51) $(C_2H_5O)_2PHO+[CH_2\text{=}CH\text{---}CO\text{---}O\text{---}CH_2]_2\rightarrow$
     $[(C_2H_5O)_2P(O)\text{---}CH_2\text{---}CH_2\text{---}CO\text{---}O\text{---}CH_2]_2$ Especially preferred classes of reactions are as follows:

Class A  $R^*M\text{---}PH(M)\text{---}R^0+R_1R_2C\text{=}CR_3R_4\rightarrow$
         $R^*M\text{---}P(M)(R^0)\text{---}CR_1R_2\text{---}CHR_3R_4$ Class B  $R^*M\text{---}PH(M)\text{---}R^0+YY'C\text{=}N\text{---}Y''\rightarrow$
         $R^*M\text{---}P(M)(R^0)\text{---}CYY'\text{---}NHY''$ Class C  $(R^*O)_2PHO+R_2CH\text{=}CR_3R_4\rightarrow$
         $(R^*O)_2P(O)\text{---}CHR_2\text{---}CHR_3R_4$ Class D  $(R^*O)_2PHO+CH_2\text{=}CR_3R_4\rightarrow$
         $(R^*O)_2P(O)\text{---}CH_2\text{---}CHR_3R_4$ Class E  $(R^*O)_2PHO+CH_2\text{=}CHR_4\rightarrow$
         $(R^*O)_2P(O)\text{---}CH_2\text{---}CH_2\text{---}R_4$ Class F  $(R^*O)_2PHO+O\text{=}C\text{=}N\text{---}R^*\rightarrow$
         $(R^*O)_2P(O)\text{---}CO\text{---}NH\text{---}R^*$ Class G  $(R^*O)_2PHO+(R^*)_2C\text{=}N\text{---}R^*\rightarrow$
         $(R^*O)_2P(O)\text{---}C(R^*)_2\text{---}NH\text{---}R^*$ The above reactions are carried out by mixing the phosphorous reagent and the unsaturated reactant, preferably in molar ratios of from about 1:1 to 5:1, and in the presence of a catalytic amount, e.g., 0.1 to 5.0% by weight, based on the reactants, of a basic catalyst including alkali and alkaline earth metals, e.g., lithium, sodium, potassium, magnesium and calcium as well as their oxides, hydroxides and alcoholates and organic nitrogen bases, e.g., pyridine, piperidine and benzyl trimethyl ammonium hydroxide. Many of the reactions are so exothermic as to require cooling, but in any case, reaction temperatures in the range of 25°–120° C. and more often 40°–100° C. are usually sufficient to effect completion of the reaction within 1 to 10 hours. In cases where thermally polymerizable olefinic compounds such as methyl acrylate are employed, higher yields of product can usually be obtained by incremental addition of the olefinic compound to the reaction mixture.

The reaction products can be isolated and purified by preferential extraction, fractional distillation or crystallization.

The following examples disclose our invention in more detail. All parts are by weight.

*Example 1*

About 0.4 part of metallic sodium is allowed to dissolve in 15.2 parts of diethyl phosphite, after which 18.5 parts of α-naphthyl isocyanate are added with stirring and cooling. The reaction mixture is allowed to stand for several hours during which time it deposits a substantially quantitative yield of white solid. The latter is recrystallized from a mixture of ethanol and n-hexane and is then found to melt at 93°–94° C. This is a new compound believed to have the structure $$\alpha\text{-}(C_{10}H_8)\text{---}NH\text{---}CO\text{---}P(O)(OC_2H_5)_2$$

*Analysis.*—Found: 4.48% N; 10.03% P. Theory ($C_{15}H_{19}O_4NP$): 4.56% N; 10.08% P.

*Example 2*

Eighteen parts of N-benzylideneaniline are slowly added to 18 parts of diethyl phosphite containing about 0.4 part of sodium dissolved therein. The reaction temperature rises to about 60° C. and the reaction mixture gradually solidifies. At this point the mixture is heated on a steam bath for 0.5 hour and is then poured into water, thus precipitating a white solid. The latter is washed with water, air-dried (yield, 31.5 parts) and recrystallized from a mixture of benzene and n-hexane, M. 90–91° C. This is a new compound believed to have the structure $$C_6H_5\text{---}CH(NH\text{---}C_6H_5)\text{---}P(O)(OC_2H_5)_2$$

*Analysis.*—Found: 4.20% N. Theory ($C_{17}H_{22}O_3NP$): 4.38% N.

*Example 3*

About 0.5 part of metallic sodium is dissolved in 35 parts of diethyl phosphite and 13.8 parts of phorone are slowly added. After the mild exothermic reaction subsides, the reaction mixture is heated on a steam bath for 2 hours after which it is evacuated at reduced pressure to remove any unreacted starting material. The 13 parts of viscous liquid residue ($n_D^{20}$ 1.4538) are believed to comprise a new compound of the structure $$[(C_2H_5O)_2P(O)\text{---}C(CH_3)_2\text{---}CH_2\text{---}]_2CO$$

*Analysis.*—Found: 14.40% P. Theory ($C_{17}H_{36}O_7P_2$): 14.95% P.

*Example 4*

To a solution of about 0.4 part of metallic sodium in 27.6 parts of diethyl phosphite are added 29.4 parts of diallyl fumarate at such a rate that the heat of reaction maintains a temperature of 50–55° C. The reaction is completed by heating for 0.5 hour on a steam bath, after which it is washed with two volumes of water and dried, yielding 33.5 parts of colorless liquid ($n_D^{20}$ 1.4380) which is believed to be mainly the new compound of the structure

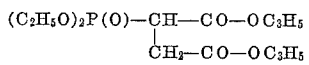

*Analysis.*—Found: 9.03% P. Theory ($C_{14}H_{23}O_7P$): 9.27% P.

*Example 5*

To a solution of about 0.5 part of metallic sodium in 35 parts of diethyl phosphite are slowly added 45.6 parts of di-n-butyl maleate at such a rate as to maintain the temperature of the exothermic reaction at about 55–60° C. The reaction is completed by heating on a steam bath for 2 hours, after which the reaction mixture is washed with two volumes of water and dried to yield 66 parts of a colorless liquid ($n_D^{20}$ 1.4527) believed to be mainly a new compound of the structure

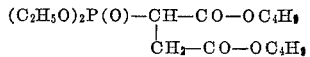

*Analysis.*—Found: 8.21% P. Theory ($C_{16}H_{31}O_7P$): 8.46% P.

*Example 6*

To a solution of about 0.23 part of metallic sodium in 41 parts of diethyl phosphite are slowly added 26 parts of methyl acrylate, the temperature of the exothermic reaction being maintained at 60–70° C. The reaction is completed by heating at 100° C. for 1 hour. Fractional distillation of the reaction mixture yields 52.4 parts of a colorless liquid, B. 103–103.2° C./0.4 mm.; $n_D^{20}$ 1.4334 which is believed to be a compound of the structure $$(C_2H_5O)_2P(O)\text{---}CH_2\text{---}CH_2\text{---}CO\text{---}OCH_3$$

*Analysis.*—Found: 14.07% P. Theory ($C_8H_{17}O_5P$): 13.82% P.

*Example 7*

About 1.2 parts of metallic sodium are dissolved in 41.4 parts of diethyl phosphite and 15.9 parts of acrylonitrile are then added slowly, with sufficient cooling to maintain the reaction temperature at about 65° C. The reaction mixture is subsequently heated on a steam bath for 1 hour and finally distilled to yield 30.8 parts of a water-soluble, colorless liquid, B. 107–111° C./0.6–0.7 mm.; $n_D^{20}$ 1.4382 which is believed to be a new compound of the structure $(C_2H_5O)_2\text{---}P(O)\text{---}CH_2\text{---}CH_2\text{---}CN$.

*Analysis.*—Found: 7.33% N; 16.45% P. Theory ($C_7H_{14}O_3NP$): 7.33% N; 16.21% P.

In the manner of previous examples, diethyl phosphite also reacts with mesityl oxide, furan, benzalacetone, furfurylideneacetone and benzyl acrylate to yield the corresponding phosphonic acid ester addition products.

Both our process and the products produced thereby are believed to be novel. The products obtained by the addition of diesters of phosphorous acid, such as the dialkyl esters thereof, and an unsaturated polybasic acid and compounds hydrolyzable thereto such as esters or nitriles thereof, are particularly valuable. Examples of the latter are the aliphatic esters of alpha-(dialkyl phosphono)-succinic acids such as are obtained, as exemplified by Examples 4 and 5 herein, by the addition reaction of a dialkyl phosphite with a di-ester of an ethylene-alpha-beta dicarboxylic acid such as diallyl fumarate, di-n-butyl maleate, etc. The invention presents a unique aspect in that where the unsaturated compound contains competing double bonds, the addition is believed to take place preferentially on the double bond alpha or beta to a carbonyl group; thus when diallyl fumarate is used in Example 4 the addition is believed to take place preferentially at the double bond in the fumaric acid residue rather than at the double bonds in the allyl groups. In the case of phorone (Example 3) the double bonds are not competing and the addition takes place equally at both.

Having thus described our invention, what we claim and desire to protect by Letters Patent is:

1. The process which comprises effecting addition-reaction of a diester of phosphorous acid and an aryl isocyanate in the presence of a basic catalyst.

2. The process which comprises effecting addition-reaction of diethyl phosphite and alpha-naphthyl isocyanate in the presence of a basic catalyst.

3. The process which comprises effecting addition-reaction of a diester of phosphorous acid and an N-aralkylidene aryl amine in the presence of a basic catalyst.

4. The process which comprises effecting addition-reaction of diethyl phosphite and N-benzylidene-aniline in the presence of a basic catalyst.

5. $(R^*O)_2P(O)$—CO—NH—Ar wherein $R^*$ is selected from the group consisting of alkyl, alkenyl, aryl, and aralkyl and Ar is aryl.

6. Alpha-$(C_{10}H_9)$—NH—CO—P(O)$(OC_2H_5)_2$.

7. Ar—CH(NH—Ar)—P(O)$(OR^*)_2$ where $R^*$ is selected from the group consisting of alkyl, alkenyl, aryl and aralkyl, and Ar is aryl.

8. $C_6H_5$—CH(NH—$C_6H_5$)—P(O)$(OC_2H_5)_2$.

No references cited.